(12) United States Patent
Uppal

(10) Patent No.: US 11,686,056 B2
(45) Date of Patent: Jun. 27, 2023

(54) LANDING PAD

(71) Applicant: Aluminium Offshore Pte Ltd, Singapore (SG)

(72) Inventor: Neelesh Uppal, Singapore (SG)

(73) Assignee: Aluminum Offshore Pte Ltd., Singapore (SG)

( * ) Notice: Subject to any disclaimer, the term of this patent is extended or adjusted under 35 U.S.C. 154(b) by 1054 days.

(21) Appl. No.: 16/310,090

(22) PCT Filed: Jun. 16, 2016

(86) PCT No.: PCT/SG2016/050275
§ 371 (c)(1),
(2) Date: Dec. 14, 2018

(87) PCT Pub. No.: WO2017/217926
PCT Pub. Date: Dec. 21, 2017

(65) Prior Publication Data
US 2019/0145067 A1    May 16, 2019

(51) Int. Cl.
*E01F 3/00* (2006.01)
*B64F 1/00* (2006.01)
(Continued)

(52) U.S. Cl.
CPC ............... *E01F 3/00* (2013.01); *A62C 3/06* (2013.01); *A62C 3/08* (2013.01); *B64F 1/00* (2013.01)

(58) Field of Classification Search
CPC .... B64F 1/00; B64F 1/007; E01F 3/00; E01F 5/00; A62C 3/06; A62C 3/08; A62C 3/00; E01C 9/008
See application file for complete search history.

(56) References Cited

U.S. PATENT DOCUMENTS 4,789,116 A    12/1988   Eftestol
4,836,472 A     6/1989   Sutter et al.
(Continued)

FOREIGN PATENT DOCUMENTS

CN        102912742 A    2/2013
KR     1020140119932 A   10/2014
(Continued)

OTHER PUBLICATIONS

International Search Report, PCT/SG2016/050275, dated Aug. 30, 2016, 4 pages.
(Continued)

*Primary Examiner* — Christopher R Dandridge

(57) ABSTRACT

A landing pad including at least one integrally formed elongated hollow decking unit having an elongated landing plate with a plurality of holes, an elongated base plate aligned longitudinally with respect to the elongated landing plate which is designed as an orifice plate and spaced a distance apart from the elongated landing plate, and two elongated side wall plates connecting the elongated landing plate to the elongated base plate. The plurality of holes may be configured to drain unburned fuel spilled on the elongated landing plate through the plurality of holes into the elongated hollow decking unit and to suppress flame of burning fuel from propagating through the plurality of holes into the elongated hollow decking unit by reducing the temperature of drained unburned fuel. The distance apart between the elongated landing plate and the elongated base plate may be configured to prevent re-ignition of the drained unburned fuel on the elongated base plate inside the elongated hollow decking unit.

15 Claims, 8 Drawing Sheets

(51) Int. Cl.
*A62C 3/06* (2006.01)
*A62C 3/08* (2006.01)

(56) References Cited

U.S. PATENT DOCUMENTS

| | | | | |
|---|---|---|---|---|
| 5,291,951 | A * | 3/1994 | Morand | A62C 5/02 169/44 |
| 9,010,051 | B2 * | 4/2015 | Mackintosh | E01C 9/008 52/168 |
| 2009/0057486 | A1 | 3/2009 | Becht, IV et al. | |
| 2011/0290509 | A1 * | 12/2011 | Uppal | A62C 99/0072 169/54 |
| 2014/0137487 | A1 | 5/2014 | Mackintosh | |
| 2014/0319273 | A1 * | 10/2014 | Rod | E01C 9/008 244/114 R |

FOREIGN PATENT DOCUMENTS

| | | |
|---|---|---|
| KR | 20160066708 A | 6/2016 |
| WO | 1997034658 A1 | 9/1997 |
| WO | 2015065645 A1 | 5/2015 |

OTHER PUBLICATIONS

Written Opinion of the International Searching Authority, PCT/SG2016/050275, dated Aug. 18, 2016, 6 pages.
Notification of transmittal of international preliminary report on patentability, PCT/SG2016/050275, dated May 30, 2017, 19 pages.
Elevated and rooftop helipads and heliports, Sep. 5, 2015, 6 pages. Retrieved on Aug. 18, 2016 from http://web.archive.org/web/20150905010256/http://www.aluminiumoffshore.com/elevated-and-rooftop-helipads-and-heliports.
Venturi effect, Dec. 29, 2015, 4 pages. Retrieved on Aug. 18, 2016 from http://web.archive.org/web/20151229161057/https://en.wikipedia.org/wikiNenturi_effect.
Communication with Supplementary European Search Report, PCT/SG2016/050275, dated Jan. 23, 2020, 8 pages.

* cited by examiner

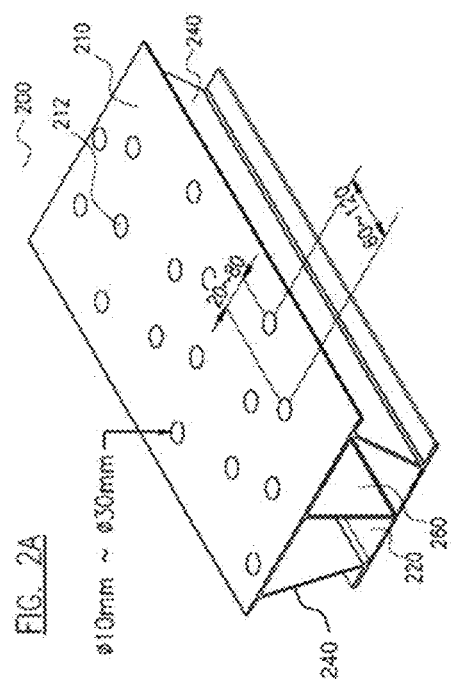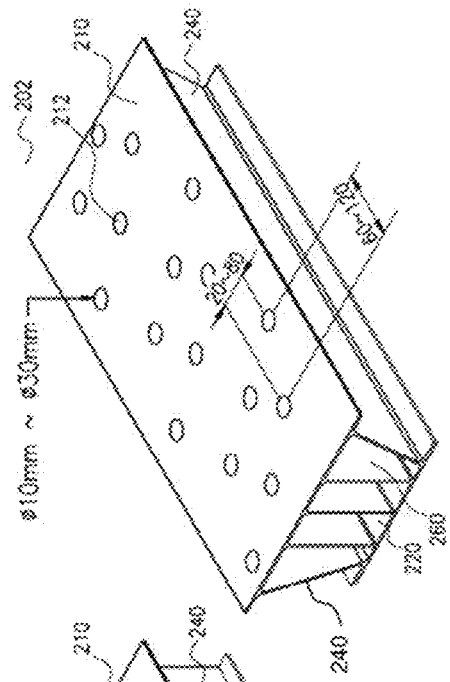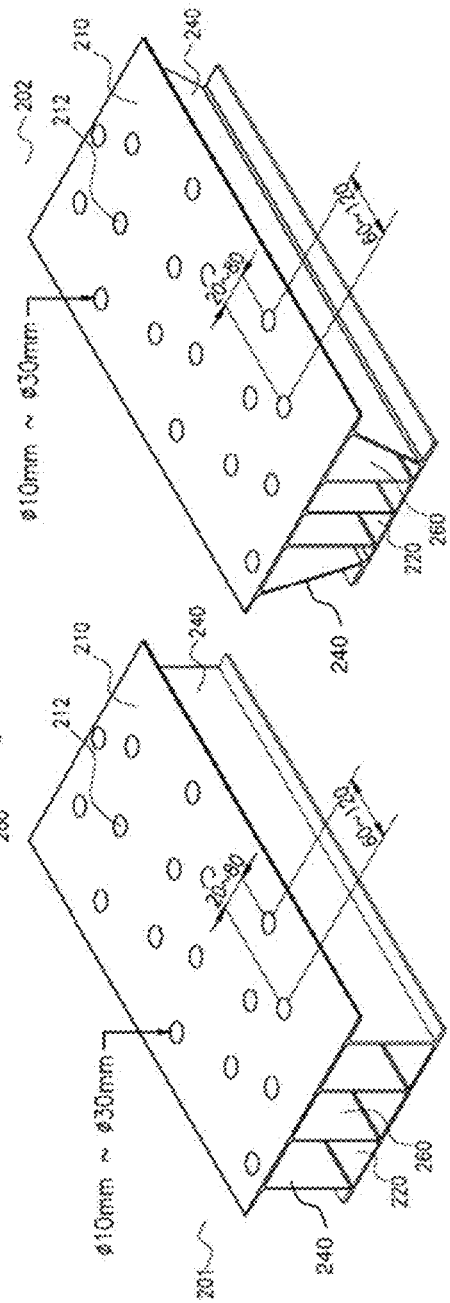

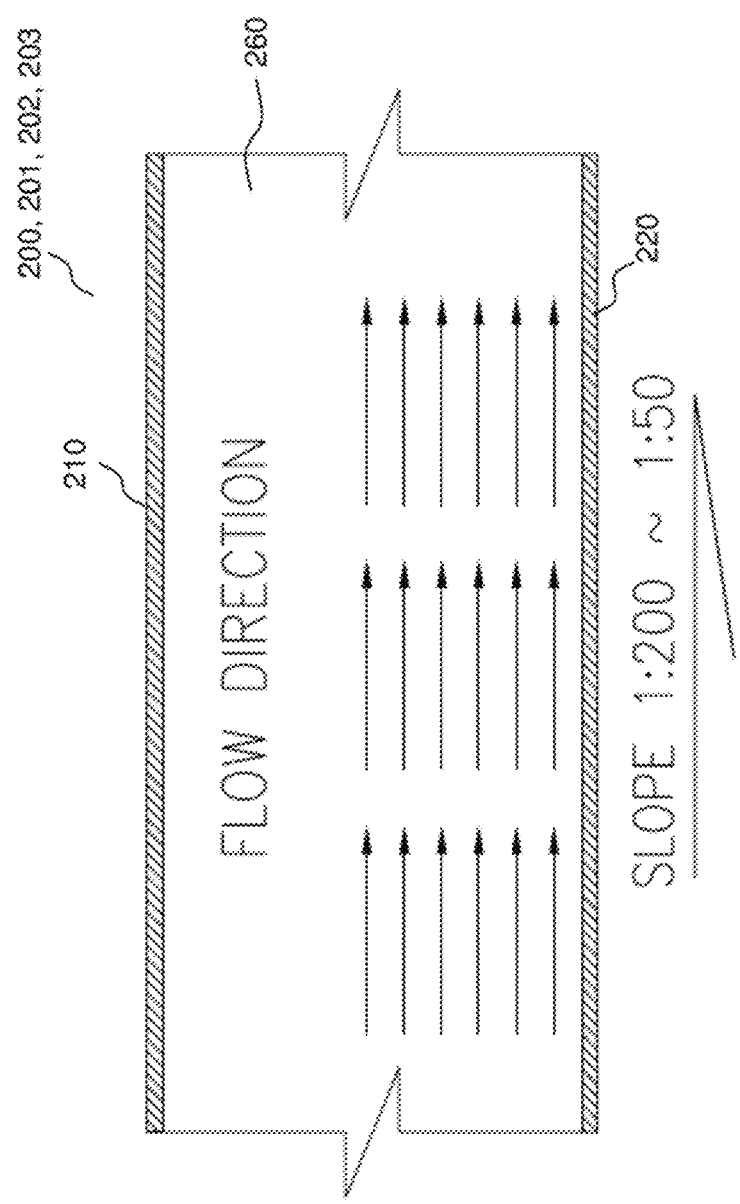

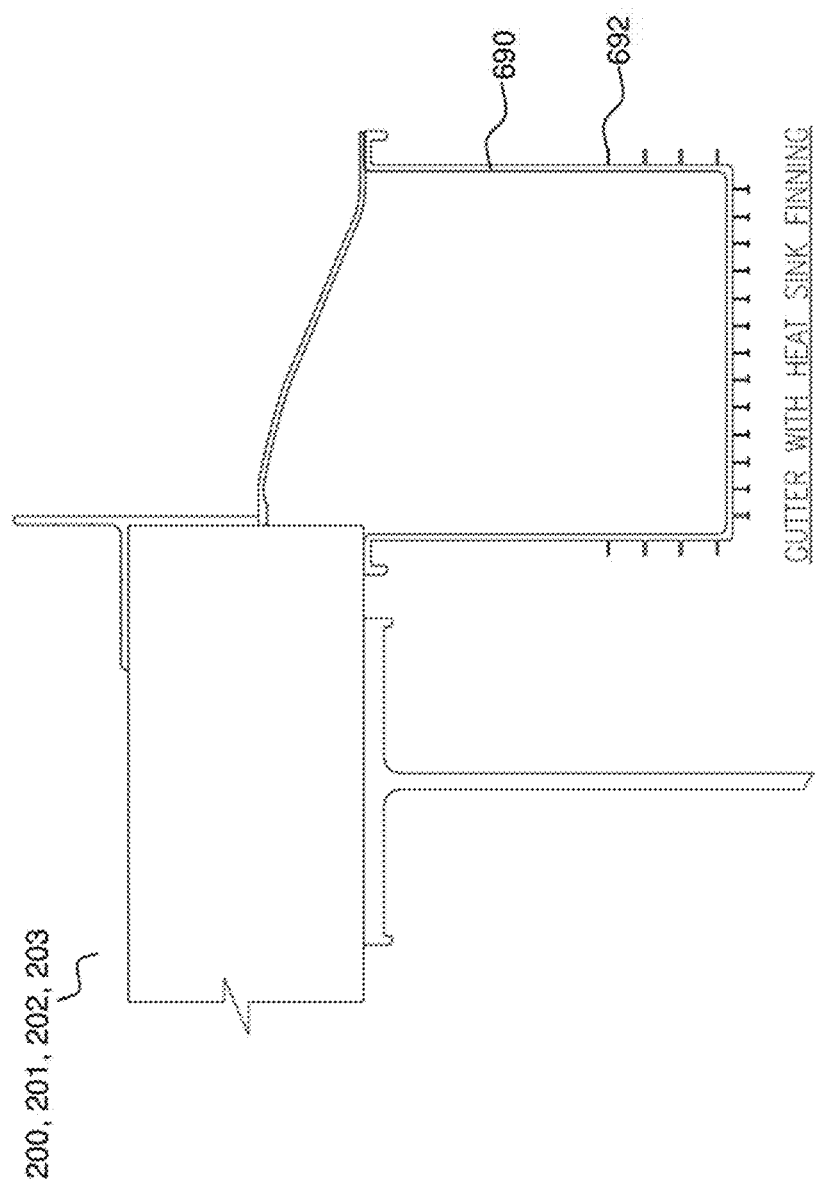

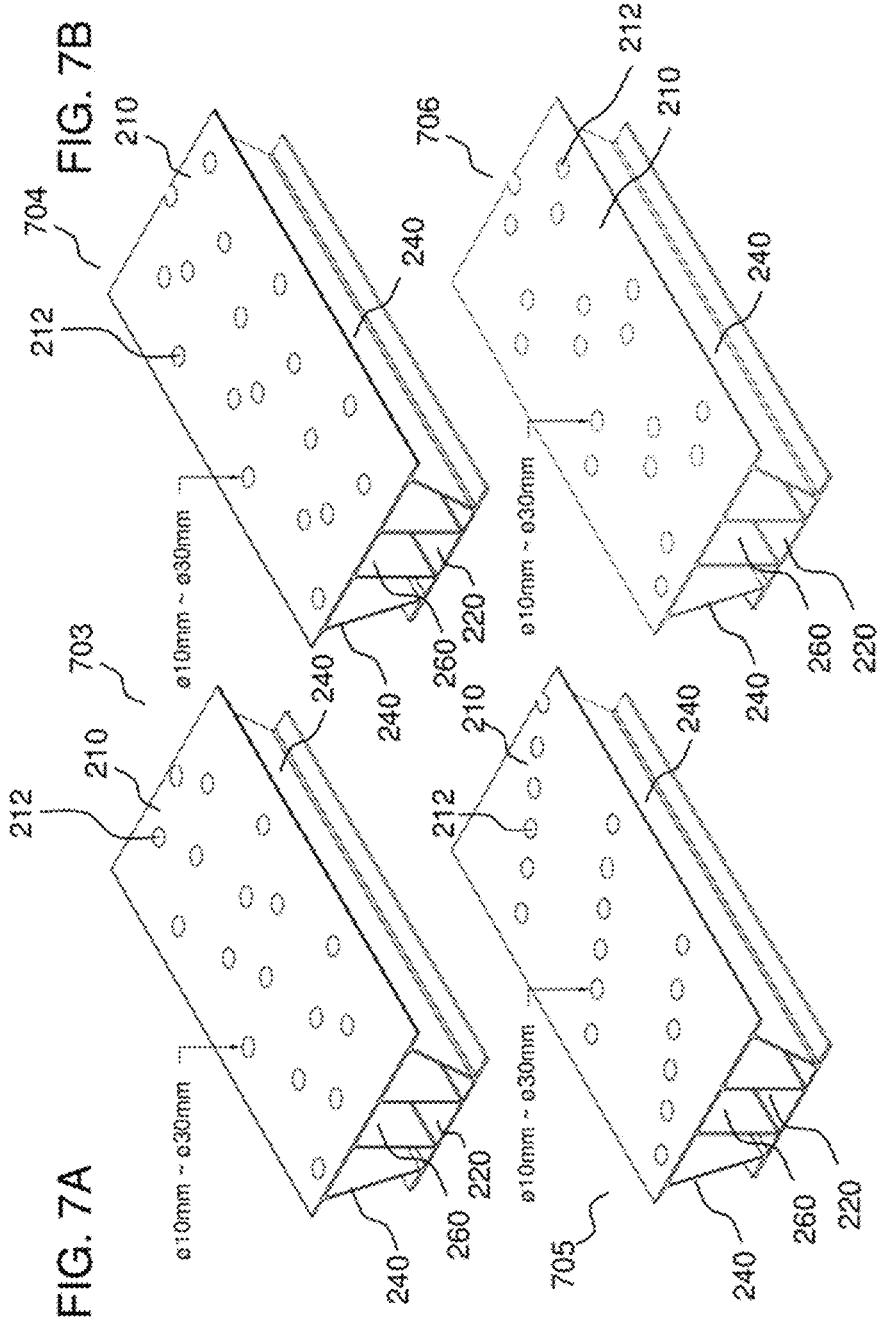

LANDING PAD

TECHNICAL FIELD

Embodiments generally relate to a landing pad.

BACKGROUND

Landing pads are commonly found in airports; on the top of high-rise buildings; and in particular, on marine vessels such as oilrigs and ships, for example. They are primarily utilized by helicopters, and in some instances, by vertical take-off and landing (VTOL) aircraft. Typically, a basic landing pad includes a smooth support surface on which an aircraft lands. The landing pads in airports may be made from steel decks, wooden decks or concrete, for example, while the landing pads in oil rigs and ships are typically made from steel or aluminium, as opposed to wood, since wood presents a greater fire hazard in the event of an onboard fire.

The aforesaid basic landing pads, regardless of whether they are land-based or sea-based, are nonetheless susceptible to damage in the event of an ignition of aviation fuel. In this respect, aviation fuel may be spilled over a landing pad as a result of negligence during a refueling process or in the event of an aircraft crashing on the pad itself. As aviation fuel typically burns at approximately 1100° C., burning aviation fuel imposes greater danger to people on the landing pad or on board of an aircraft and, in addition, easily causes severe structural damage to landing pads of the above-mentioned basic design as there is no fire suppression or fire retardation means provided with these basic landing pads. For example, when a fire breaks out on a basic landing pad as described above, the fire service (local or airport) is usually relied on to extinguish the fires. However, as the ignition of aviation fuel is a sudden and violent event, usually the time taken for the fire services to respond is too long to prevent significant damage from taking place to the landing pad. In the case of a marine vessel, a fire on its basic landing pad could easily spread to the rest of the vessel resulting in catastrophic consequences.

Accordingly, example embodiments seek to provide a landing pad that addresses at least some of the issues identified above.

SUMMARY

According to various embodiments, there is provided a landing pad including at least one integrally formed elongated hollow decking unit having an elongated landing plate with a plurality of holes, an elongated base plate aligned longitudinally with respect to the elongated landing plate and spaced a distance apart from the elongated landing plate, and two elongated side wall plates connecting the elongated landing plate to the elongated base plate. The plurality of holes may be configured to drain unburned fuel spilled on the elongated landing plate through the plurality of holes into the elongated hollow decking unit and to suppress flame of burning fuel from propagating through the plurality of holes into the elongated hollow decking unit. The distance apart between the elongated landing plate and the elongated base plate may be configured to prevent re-ignition of drained unburned fuel on the elongated base plate inside the elongated hollow decking unit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIGS. 2A to 2C show various embodiments of an integrally formed elongated hollow decking unit of a landing pad;

FIG. 5 shows a longitudinal cross-sectional view of a portion of the elongated hollow decking unit according to various embodiments;

FIG. 6 shows a cross-sectional side view of the connection between one end of the elongated hollow decking unit with the enclosed channel according to various embodiments; and FIGS. 7A to 7D show various embodiments of an integrally formed elongated hollow decking unit of a landing pad.

DETAILED DESCRIPTION

Embodiments described below in context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Figure 1:
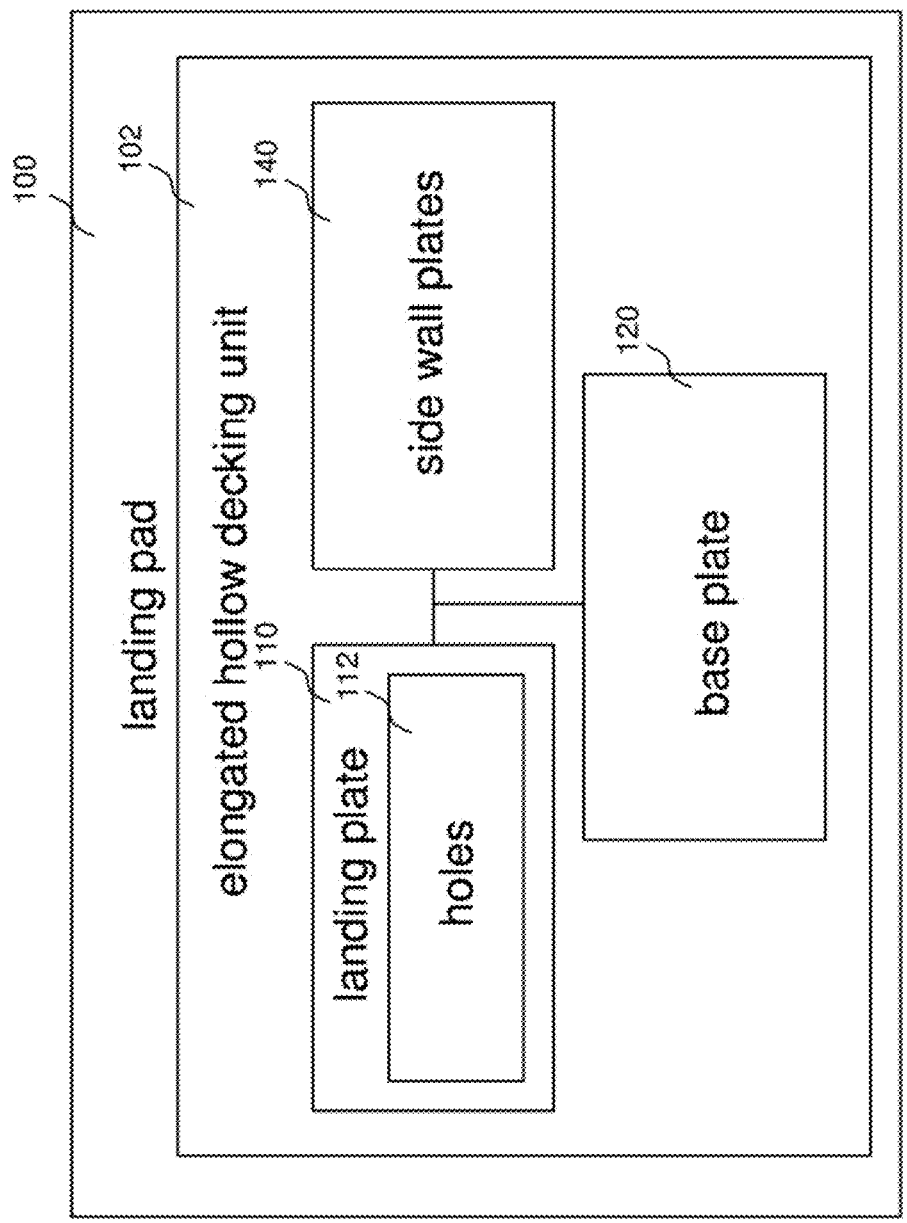
FIG. 1 shows a schematic diagram of a landing pad according to various embodiments.

FIG. 1 shows a schematic diagram of a landing pad 100 according to various embodiments. The landing pad may include at least one integrally formed elongated hollow decking unit 102. The at least one integrally formed elongated hollow decking unit 102 may include an elongated landing plate 110 having a plurality of holes 112. The elongated hollow decking unit 102 may further include an elongated base plate 120 aligned longitudinally with respect to the elongated landing plate 110 and spaced a distance apart from the elongated landing plate 110. The elongated hollow decking unit 102 may further include two elongated side wall plates 130 connecting the elongated landing plate 110 to the elongated base plate 120. Accordingly, a longitudinal edge of a first side wall plate of the two elongated side wall plates 140 may be joined to one longitudinal edge of the elongated landing plate 110, and another longitudinal edge of the first side wall plate of the two elongated side wall plates 140 may be joined to a corresponding longitudinal edge of the elongated base plate 120. Similarly, a longitudinal edge of a second side wall plate of the two elongated side wall plates 140 may be joined with another longitudinal edge of the elongated landing plate 110, and another longitudinal edge of the second side wall plate of the two elongated side wall plates 140 may be joined to a corresponding longitudinal edge of the elongated base plate 120 in a similar manner. Thus, the elongated landing plate 110, the elongated base plate 120 and the two elongated side wall plates 140 may define a hollow space inside the elongated hollow decking unit 102.

In other words, the at least one integrally formed elongated hollow decking unit may include an elongated flat top portion having a landing surface on the exterior, an elongated flat bottom portion arranged lengthwise with respect to the elongated flat top portion, and two elongated flat side portions joining the elongated flat top portion to the elongated flat bottom portion. One of the two elongated flat side portions may join the elongated flat top portion to the elongated flat bottom portion along one longitudinal side of the elongated hollow decking unit. Another one of the two elongated flat side portions may similarly join the elongated flat top portion to the elongated flat bottom portion along another side of the elongated hollow decking unit. Accordingly, the elongated flat top portion, the elongated flat bottom portion and the two elongated flat side portions may define a hollow space through the elongated hollow decking unit in the lengthwise direction.

According to various embodiments, the plurality of holes 112 may be configured to drain unburned fuel spilled on the elongated landing plate 110 through the plurality of holes 112 into the elongated hollow decking unit 102 and to suppress flame of burning fuel from propagating through the plurality of holes 112 into the elongated hollow decking unit 102.

According to various embodiments, the distance apart between the elongated landing plate 110 and the elongated base plate 120 may be configured to prevent re-ignition of drained unburned fuel on the elongated base plate 120 inside the elongated hollow decking unit 102.

According to various embodiments, the plurality of holes 112 may be configured to cause an expansion of the unburned fuel as the unburned fuel exits from the plurality of holes 112 into the hollow space below the elongated landing plate 110.

According to various embodiments, the plurality of holes 112 may be dimensioned such that pressure of unburned fuel on the elongated landing plate 110 may be greater than the pressure of unburned fuel exiting the plurality of holes 112 into the hollow space. The pressure of unburned fuel exiting the plurality of holes 112 may be greater than the pressure of unburned fuel passing through the plurality of holes 112.

According to various embodiments, each of the plurality of holes may be dimensioned to have a diameter of approximately 0.01 m to 0.03 m.

According to various embodiments, a distance apart between any two adjacent holes of the plurality of holes may be approximately 0.02 m to 0.08 m in a breadthwise direction with respect to the elongated landing plate 110, and approximately 0.06 m to 0.12 m in a lengthwise direction with respect to the elongated landing plate 110.

According to various embodiments, a distance apart between the elongated landing plate 110 and the elongated base plate 120 may be configured to be approximately 0.12 m to 0.18 m.

According to various embodiments, the elongated hollow decking unit 102 may further include an elongated partition wall disposed between the two elongated side walls 140, wherein a longitudinal edge of the elongated partition wall may join with the elongated landing plate 110 and the other longitudinal edge of the elongated partition wall may join with the elongated base plate 120.

According to various embodiments, the elongated hollow decking unit 102 may include two or more elongated partition walls.

According to various embodiments, the elongated hollow decking unit 102 may be configured to slope in a longitudinal direction with respect to a horizontal plane.

According to various embodiments, a slope profile of the elongated hollow decking unit 102 may be approximately between 1:200 to 1:50.

According to various embodiments, the two elongated side wall plates 140 may be arranged to be slanted or vertical.

According to various embodiments, the plurality of holes 112 may be configured to limit ventilation into the elongated hollow decking unit 102.

According to various embodiments, the plurality of holes 112 may be arranged randomly.

According to various embodiments, the plurality of holes 112 may be arranged in a line.

According to various embodiments, the plurality of holes 112 may be arranged in pairs of two holes having a fixed distance apart between the two holes in a pair.

According to various embodiments, the plurality of holes 112 may be arranged in pairs of two holes with single holes interspersed among the pairs of two holes, wherein the two holes in a pair have a fixed distance apart.

According to various embodiments, the arrangement of the plurality of holes 112 may be repeated.

According to various embodiments, an end of the elongated hollow decking unit may be connected to an enclosed channel arranged substantially perpendicular to the elongated hollow decking unit.

According to various embodiments, a connection between the elongated hollow decking unit 102 and the enclosed channel is configured to limit ventilation into the enclosed channel.

According to various embodiments, the enclosed channel may include external heat sink fins.

FIGS. 2A to 2C show various embodiments of an integrally formed elongated hollow decking unit 200, 201, 202 of a landing pad. The integrally formed elongated hollow decking unit 200, 201, 202 may be formed by extrusion. According to various embodiments, the integrally formed elongated hollow decking unit 200, 201, 202 may be extruded as a single piece. Advantageously, extruding the elongated hollow decking unit 200, 201, 202 as a single piece may increase the ease of manufacture, shorten the time for manufacture and reduce the cost of manufacture.

As shown in FIGS. 2A to 2C, the integrally formed elongated hollow decking unit 200, 201, 202 may include an elongated landing plate 210 having a plurality of holes 212. As shown in FIGS. 2A to 2C, the plurality of holes may be arranged in a random pattern. A distance between any two adjacent holes on the elongated landing plate 210 may be between 20 mm to 80 mm (0.02 m to 0.08 m) when measured in the breadthwise direction with respect to the elongated landing plate 210. Further, a distance between any two adjacent holes may be between 60 mm to 120 mm (0.06 m to 0.12 m) when measured in the lengthwise direction with respect to the elongated landing plate 210.

Further, the elongated hollow decking unit 200, 201, 202 may include an elongated base plate 220 aligned longitudinally with respect to the elongated landing plate 210 and spaced a distance apart from the elongated landing plate 210. The elongated landing plate 210 and the elongated base plate 220 may be arranged such that they are substantially parallel to each other. As shown, the elongated landing plate 210 and the base plate 220 may be rectangular in shaped. A length of the elongated landing plate 210 may be the same as a length of the elongated base plate 220. A width of the elongated landing plate 210 may be wider than a width of the elongated base plate 220.

The elongated hollow decking unit 200, 201, 202 may further include two elongated side wall plates 240 connecting the elongated landing plate 210 to the elongated base plate 220. One of the two elongated flat side wall plates 240 may join the elongated landing plate 210 to the elongated base plate 220 along one longitudinal side of the elongated hollow decking unit 200, 201, 202. Another one of the two elongated flat wall plates 240 may similarly join the elongated landing plate 210 to the elongated base plate 220 along another longitudinal side of the elongated hollow decking unit 200, 201, 202.

According to various embodiments, the elongated landing plate 210, the elongated base plate 220, and the two elongated side wall plates 240 may define a hollow space 260 through the integrally formed elongated hollow decking unit 200, 201, 202 in the lengthwise direction. The hollow space 260 may be a void below the elongated landing plate 210 such that fuel spilled on the elongated landing plate 210 may flow through the plurality of holes 212 into the hollow space 260.

Figure 3A:
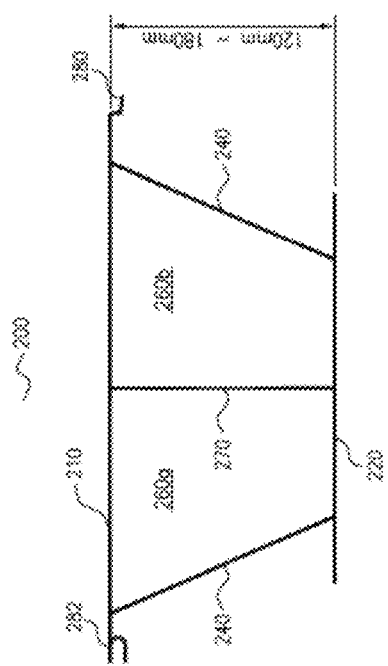
FIGS. 3A to 3C show cross-sectional view of the elongated hollow decking unit of FIGS. 2A to 2C respectively according to various embodiments.
Figure 3C:
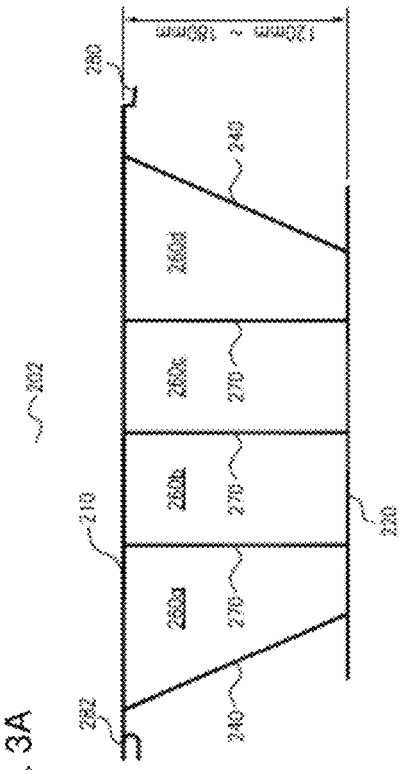
Figure 3B:
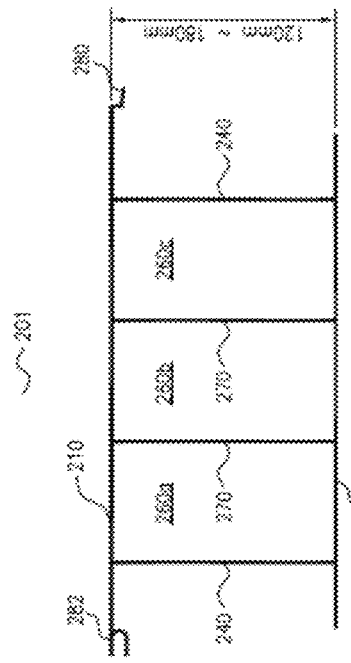

FIGS. 3A, 3B and 3C show cross-sectional views of the elongated hollow decking unit 200, 201, 202 of FIGS. 2A, 2B and 2C respectively. Also shown in FIGS. 3A, 3B and 3C, the elongated hollow decking unit 200, 201, 202 may include a partition wall 270 disposed between the two elongated side walls 240. The partition wall 270 may also be elongated such that it has the same length as the elongated hollow decking unit 200, 201, 202. A longitudinal edge of the elongated partition 270 wall may join with the elongated landing plate 210 and another longitudinal edge of the elongated partition 270 wall may join with the elongated base plate 220. The partition wall 270 may divide the hollow space 260. In FIG. 3A, one partition wall is shown to divide the space below the elongated landing plate 210 into two separate hollow spaces 260a and 260b. In FIG. 3B, two partition walls 270 are shown to divide the space below the elongated landing plate 210 into three separate hollow spaces 260a, 260b, 260c. In FIG. 3C, three partition walls 270 are shown to divide the space below the elongated landing plate 210 into four separate hollow spaces 260a, 260b, 260c, 260d. According to various embodiments, the elongated hollow decking unit may include one or more elongated partition walls 270.

Figure 4A:
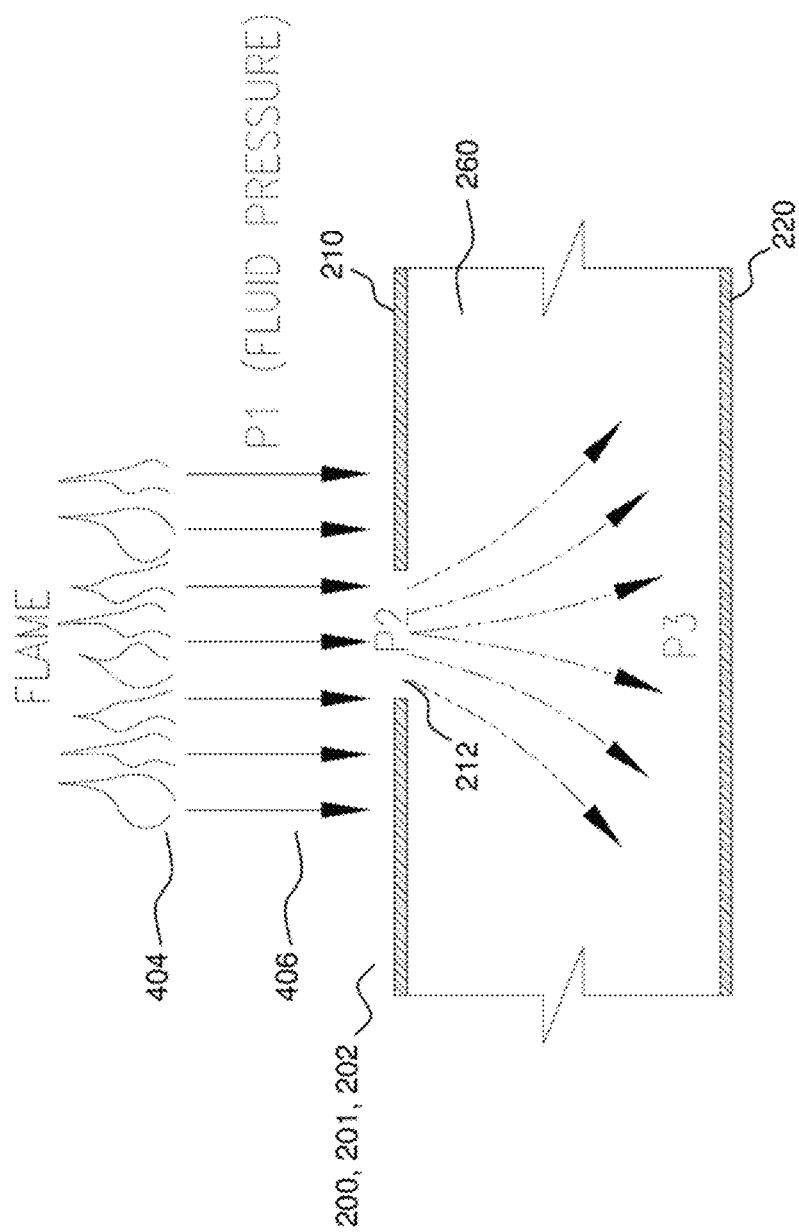
FIG. 4A shows a closed up view of a cross section of a portion of the elongated hollow decking unit according to various embodiment.

According to various embodiments, the plurality of holes 212 on the elongated landing plate 210 may be configured to drain unburned fuel spilled on the elongated landing plate 210 through the plurality of holes 212 into the elongated hollow decking unit 200, 201, 202, and to suppress flame of burning fuel from propagating through the plurality of holes 212 into the elongated hollow decking unit 200, 201, 202. According to various embodiments, the plurality of holes 212 may be configured to cause an expansion of unburned fuel as the unburned fuel exits from the plurality of holes into the hollow space below the elongated landing plate. The expansion of the unburned fuel may cause dissipation of heat, thus causing the temperature of the unburned fuel to decrease. In this manner, by removing the heat from the unburned fuel, the propagation of fire or flame through the plurality of holes 212 to the unburned fuel in the hollow space 260 may be prevented or suppressed. FIG. 4A shows a closed up view of a cross section of a portion of the elongated hollow decking unit 200, 201, 202. As shown, any fuel spilled on the elongated landing plate 210 which is on fire may include two layers. A first layer 404 which includes flames on surface, and a second layer 406 which includes unburned fuel with a pressure of P1. According to various embodiments, fuel flowing through the hole 212 of the elongated landing plate 210 may have a pressure of P2. Further, the hollow space 260, which may be in the form of a large void, below the elongated landing plate 210 may have a pressure of P3.

According to various embodiments, the elongated landing plate 210 may be configured to be an orifice plate to facilitate the discharge of fuel or fluids. Accordingly, the elongated landing plate 210 may rely on Venturi effect, namely Bernoulli's principle, which states that there is a relationship between the pressure of the fluid and the velocity of the fluid. When the velocity increases, the pressure decreases and vice versa. An orifice plate may help to generate pressure drop and an increase in fluid velocity through suitably sized holes. When a fluid passes through the orifice, its pressure may build up slightly upstream of the orifice but as the fluid is forced to pass through the hole, the velocity may increase and the fluid pressure may decrease. A little downstream of the orifice the flow may reach its maximum velocity and its minimum pressure. Beyond that, the flow may expand such that the velocity may fall and the pressure may increase. During flow expansion, its heat may be partially dissipated and hence its temperature may be reduced.

As shown in FIG. 4A, fuel may flow from the decking surface of the elongated landing plate 210 through perforated holes 212 down to the hollow space 260 below the elongated landing plate 210. The mass of fluid in a flow system as shown is constant according to the Law of Conservation of Mass or Equation of Continuity.

Figure 4B:
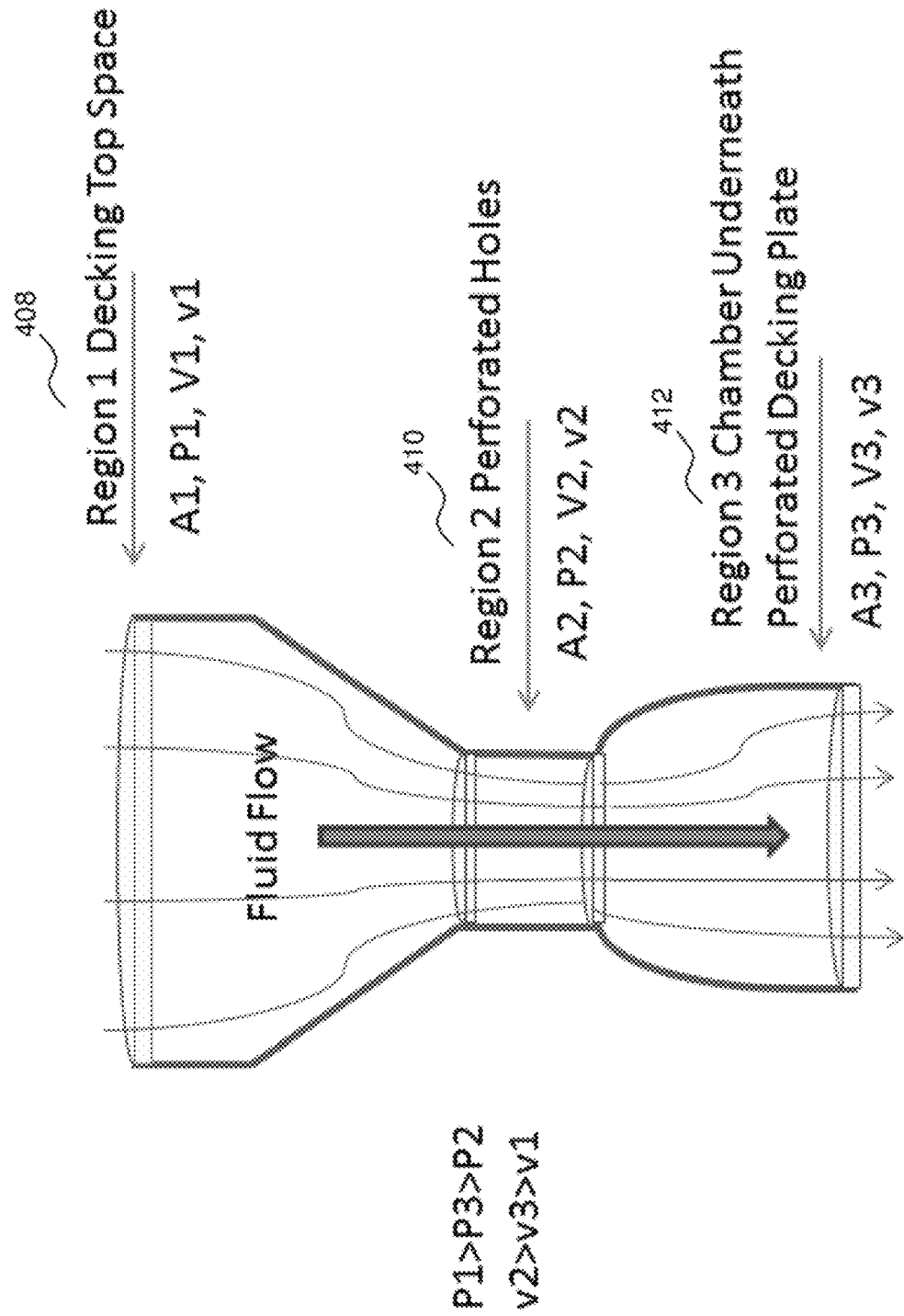
FIG. 4B shows an illustration of fuel flow phenomenon through the plurality of holes in the elongated landing plate of the elongated hollow decking unit according to various embodiments.

FIG. 4B shows an illustration of fuel flow phenomenon through the plurality of holes 212 in the elongated landing plate 210. As shown in FIG. 3B, the mass flowing in decking top space (region 1) 408 is equal to mass flowing through perforated holes (region 2) 410 to the underneath chamber (region 3) 412. In mathematical expression, $$M1=M2=M3;$$

$$\rho*V1=\rho*V2=\rho*V3 \,(V1/V2/V3 \text{ Fluid volume in different sections});$$

$$\rho*A1*v1*\Phi t=\rho*A2*v2*\Phi t=\rho*A3*v3*\Phi t$$

For incompressible flow (For example when fuel density is constant from decking channel through perforated hole to lower chambers), the following relationship can be achieved:

$$A1v1=A2v2=A3v3.$$

where M mass; ρ density; V volume; v velocity; Φt time difference.

The relationship above indicates that the higher cross section area the fluid flows through, is balanced with lower flow velocity. If the cross section area in different regions are A1>A3>A2 then the flow velocity shall be v2>v3>v1.

Bernoulli's principle states that an increase in the speed of the fluid occurs simultaneously with a decrease in pressure.

This phenomenon can be explained in terms of the law of conservation of energy. In physics, the work done by corresponding fluid volumes in the specific region equals to the product of the pressure and the volume. As a fluid moves from a wider region into a narrower region or a constriction, a corresponding volume must move a greater distance forward in the narrower region and thus have a greater speed. Since the speed is greater in the narrower region, the kinetic energy of that volume is greater. Then, by the law of conservation of energy, this increase in kinetic energy must be balanced by a decrease in the pressure-volume product (work done), and since the volumes are equal, by a decrease in pressure. Therefore, P1>P3>P2.

Bernoulli Equation States for any point along fluid flow:

$$P + \tfrac{1}{2}*\rho*v^2 + \rho*g*h = \text{constant}$$

where P is fluid pressure term; $\tfrac{1}{2}*\rho*v^2$ is kinetic energy term; $\rho*g*h$ is potential energy term; P is pressure and h is elevation.

In any point of 3 different regions, $$P1 + \tfrac{1}{2}*\rho*v1^2 + \rho*g*h1 = P2 + \tfrac{1}{2}*\rho*v2^2 + \rho*g*h2 = P3 + \tfrac{1}{2}*\rho*v3^2 + \rho*g*h3$$

Given situation where elevation difference is small and potential energy term is negligible the smaller fluid flow velocity or kinetic energy term will be balanced by fluid pressure. If v2>v3>v1 then P1>P3>P2.

Accordingly, in various embodiments, the pressure P1 of unburned fuel may be greater than the pressure P3 of the hollow space 260, which is greater than the pressure P2 of the fuel at the holes 212. Accordingly, as fuel is passing through the plurality of holes 212, the velocity of the fuel may increase and the pressure of the fuel may decrease. Upon exiting the plurality of holes 212 to enter the hollow space 260 below the elongated landing plate 210, the flow of fuel may expand such that velocity may decrease and the pressure may increase. As the fuel expands, the heat in the fuel may be partially dissipated such that the temperature of the fuel may decrease. Thus, with the decrease in temperature of the fuel, the likelihood of the propagation of flame to the fuel through the plurality of the holes 212 into the hollow space 260 may be decreased.

According to various embodiments, the plurality of holes 212 may be configured by providing holes with suitable hole size and/or suitable distance apart between two adjacent holes such that the fuel flow phenomenon described above may be achieved. According to tests conducted, not all hole sizes and/or distance apart between two adjacent holes may drain unburned fuel spilled on the elongated landing plate 210 through the plurality of holes 212 into the elongated hollow decking unit 200, 201, 202, and, at the same time, suppress flame of burning fuel from propagating through the plurality of holes 212 into the elongated hollow decking unit 200, 201, 202, by causing an expansion of unburned fuel as the unburned fuel exits from the plurality of holes 212 into the hollow space 260 below the elongated landing plate 210 as described above. If the holes are too big, fuel will just flow through without suppression of fire because the fuel will not experience changes in pressure or velocity or expansion that may reduce the temperature. If the holes are too close, the fuel may just drain away quickly through the holes along with the fire without suppression of the flame because there is insufficient build-up pressure for the fuel at the top of the elongated landing plate 210 to achieve the fuel flow phenomenon described above to suppress the flame. If the holes are too far apart, the fuel may not be drained away fast enough and the fire on top of the elongated landing plate 210 may spread into a larger area.

According to various embodiments, the plurality of holes 212 may be dimensioned to have a diameter such that pressure P1 of fuel before entering the plurality of holes 212 is greater than the pressure P3 of fuel exiting the plurality of holes 212, which in turn is greater than the pressure P2 of fuel that is passing through the plurality of holes 212. Accordingly, the velocity of the fuel passing through the plurality of holes 212 may be increased and the pressure of the fuel may be decreased as compared to the velocity and pressure of the fuel before entering the plurality of holes. Upon exiting from the plurality of holes 212 to enter the hollow space 260 below the elongated landing plate 210, the flow of fuel may expand such that velocity may decrease and the pressure may increase. As the fuel expands, the heat in the fuel may be partially dissipated such that the temperature of the fuel may be sufficiently decreased to suppress the propagation of flame. According to various embodiments, a distance apart between two adjacent holes may be configured to allow pressure build-up before the fuel pass through the plurality of holes to achieve P1>P3>P2.

According to various embodiments, the plurality of holes 212 may be dimensioned to have a diameter of approximately 10 mm to 30 mm (0.01 m to 0.03 m). According to various embodiments, a distance apart between two adjacent holes of the plurality of holes is approximately 20 mm to 80 mm (0.02 m to 0.08 m) in a breadthwise direction with respect to the elongated landing plate, and approximately 60 mm to 120 mm (0.06 m to 0.12 m) in a lengthwise direction with respect to the elongated landing plate. The above dimensions may adequately drain unburned fuel spilled on the elongated landing plate 210 through the plurality of holes 212 into the elongated hollow decking unit 200, 201, 202, and may suppress flame of burning fuel from propagating through the plurality of holes 212 into the elongated hollow decking unit 200, 201, 202 by causing an expansion of unburned fuel as the unburned fuel exits from the plurality of holes 212 into the hollow space 260 below the elongated landing plate 210 as described above.

According to various embodiments, the plurality of holes 212 may be further configured to limit ventilation into the hollow space 260 of the elongated hollow decking unit 200, 201, 202, without compromising the drainage of unburned fuel through the plurality of holes 212. Advantageously, by limiting the ventilation into the hollow space 260, air draft through the hollow space 260 may be reduced. Accordingly, supply of air to the unburned fuel inside the hollow space 260 may be restricted, thus further preventing or reducing the likelihood of re-ignition of the unburned fuel that has been drained into the hollow space 260.

According to various embodiments, the plurality of holes 212 with a diameter of approximately 10 mm to 30 mm (0.01 m to 0.03 m) may also allow good fuel flow through the plurality of holes 212 and may, at the same time, limit free air ingress to limit ventilation. As mentioned earlier, with such dimensions, the velocity of the fuel coursing through the plurality of holes 212 into the hollow space 260 below the elongated landing plate 210 may be increased. The flow of the fuel through the plurality of holes 212 may temporary block ventilation through the plurality of holes 212 as the fuel passes through the plurality of holes 212. With the ventilation temporary limited by the flow of the fuel, the flame of the burning fuel above the elongated landing plate 210 may be prevented from propagating through the plurality of holes into the hollow space 260 below the elongated landing plate 210. Further, the unburned fuel in the hollow space 260 may be evacuated quickly so that there may be insufficient fuel load in the hollow space 260 directly below the portion of the elongated landing plate with the burning fuel for flame to propagate through the plurality of holes.

According to various embodiments, the distance apart between the elongated landing plate 210 and the elongated base plate 220 may be configured to prevent re-ignition of drained unburned fuel on the elongated base plate 220 inside the hollow space 260 of the elongated hollow decking unit 200, 201, 202. Referring to FIGS. 3A to 3C, the distance apart between the elongated landing plate 210 and the elongated base plate 220 may be configured to be approximately between 120 mm to 180 mm (0.12 m to 0.18 m). This distance apart may create a large drop from the elongated landing plate 210 to the elongated base plate 220. Accordingly, the distance between the elongated landing plate 210 to the elongated base plate 220 may help to isolate the burning fuel on the exterior surface of the elongated landing plate 210 from the drained unburned fuel that has dropped through the hollow space 260 onto the elongated base plate 220 inside the elongated hollow decking unit 200, 201, 202. This distance may also prevent fuel re-ignition of the drained unburned fuel. According to tests conducted, if the distance apart between the elongated landing plate 210 and the elongated base plate 220 is insufficient, there may be insufficient space for the expansion of fuel according to the fuel flow phenomenon above to dissipate sufficient heat to prevent the propagation of flame through the plurality of holes 212. Accordingly, a minimum distance apart of approximately 120 mm (0.12 m) is required in order to sufficiently prevent the re-ignition of drained unburned fuel inside the elongated hollow decking unit.

Further, advantageously, the above depth of the hollow space 260 may also reduce the possibility of fuel re-ignition in case of a traumatic puncture of the elongated landing plate 210 caused by a helicopter crash. According to various embodiments, the deep hollow space 260 may carry fuel at a maximum discharge rate to a safe area.

According to various embodiments, the combination of the draining of fuel and suppression of flame as a result of the plurality of suitably sized and space apart holes, along with the steep drop for the fuel as a result of the suitably dimensioned distance apart between the elongated landing plate 210 and the elongated base plate 220, may aid in the divorce between the flames and the fuel for burning fuel that is spilled on the elongated landing plate 210. As discussed previously, the elongated landing plate 210 in the form of an orifice plate may change pressure of burning fuel, which may screen the fire on top, and may channel away unburned fuel fast with Venturi effect and Bernoulli's Principle. After the fluid pass through the plurality of holes 212, the fuel may expand and may reduce temperature immediately. The suitably dimensioned hole size and distance apart between holes on the elongated landing plate 210 may allow increase in fluid velocity and optimize discharge rate. According to various embodiments, if the distance apart between the elongated landing plate 210 and the elongated base plate 220 is lesser than 120 mm (0.12 m), there may be a potential for fuel to mix with flames in the case of a traumatic puncture of the elongated landing plate 210 during landing accident. For example in a helicopter accident on a landing pad, one may reasonably expect that the rotor blades may detach or embed themselves into the decking. Since most decking is only 3-6 mm thick aluminium plate, the kinetic energy of this impact may cause a traumatic puncture of the decking. One may expect flames to then enter a space below the decking through the puncture. However, if there is enough depth in the space below, the fuel could be evacuated without the flames.

Further, according to various embodiments, the hollow space 260 below the elongated landing plate 210 may be partition into multiple hollow spaces. Advantageously, by partitioning the hollow space 260 below the elongated landing plate 210, fuel flow may be separated into different fuel streams rather than one large stream. Separating the fuel stream may reduce the spread of fire.

Further, as shown in FIGS. 3A to 3C, the two elongated side wall plates 240 may be arranged to be slanted or vertical. As shown in FIGS. 3A and 3C, the cross-sectional profile of the two elongated side wall plates 240 may form a substantially v-shaped configuration.

Furthermore, as shown in FIGS. 3A to 3C, each of the longitudinal edge of the landing plate 210 is shown to include interconnecting elements 280, 282. The interconnecting elements 280, 282 may be configured to interconnect with a corresponding interconnecting element from another elongated hollow decking unit. The interconnecting element 280, along one longitudinal edge of the landing plate 210, may be a male interconnecting element in the form of a protrusion. The interconnecting element 282, along another longitudinal edge of the landing plate 210, may be a female interconnection element in the form of a corresponding depression. Accordingly, two elongated hollow decking unit may be joined together via a plug and socket type interconnection.

According to various embodiments, the elongated hollow decking unit 200, 201, 202 of the landing pad may be configured to slope in a longitudinal direction with respect to a horizontal plane. Accordingly, when the elongated hollow decking unit 200, 201, 202 is installed to form the landing pad, the elongated hollow decking unit 200, 201, 202 may be installed in an incline disposition lengthwise, such that the elongated hollow decking unit 200, 201, 202 may be sloped with one end of the elongated hollow decking unit lower than another end of the elongated hollow decking unit. FIG. 5 shows a longitudinal cross-sectional view of a portion of the elongated hollow decking unit 200, 201, 202. According to various embodiments, in the installed position, a slope profile of the elongated hollow decking unit 200, 201, 202 may be approximately between 1:200 to 1:50. Accordingly, the elongated hollow decking unit 200, 201, 202 may be suitably sloped so that the flow of fuel may be accelerated without compromising the stability of an aircraft, e.g. helicopter, rested on the elongated landing plate 210.

According to various embodiments, an end of the elongated hollow decking unit 200, 201, 202 may be connected to an enclosed channel arranged substantially perpendicular to the elongated hollow decking unit 200, 201, 202. FIG. 6 shows a cross-sectional side view of the connection between one end of the elongated hollow decking unit 200, 201, 202 with the enclosed channel 690. The enclosed channel 690 may be in the form of a gutter. According to various embodiments, the connection between the elongated hollow decking unit 200, 201, 202 and the enclosed channel 690 may be configured to limit ventilation into the enclosed channel 690. According to various embodiments, the sealing at the connection may be configured to be air-tight to prevent ingress of air.

As shown in FIG. 6, the enclosed channel 690 may further include external heat sink fins 692. The external heat sink fins 692 may dissipate residue heat in the fuel to bring down the temperature of the fuel such that re-ignition of the fuel may be prevented.

FIGS. 7A to 7D show various embodiments of elongated hollow decking unit 703, 704, 705, 706 with various arrangement of the plurality of holes 212. As shown in FIG. 7A, the plurality of holes 212 of the elongated hollow decking unit 703 may be arranged in a random pattern. As shown in FIG. 7B, the plurality of holes of the elongated hollow decking unit 704 may be arranged in a pattern having pairs of two holes with single holes interspersed among the pairs of two holes, wherein two holes in a pair may have a fixed distance apart. As shown in FIG. 2C, the plurality of holes of the elongated hollow decking unit 705 may be arranged in a line pattern or in multiple lines pattern. As shown in FIG. 7D, the plurality of holes of the elongated hollow decking unit 706 may be arranged in a pattern having pairs of two holes having a fixed distance apart between the two holes in a pair. According to various embodiments, the arrangement of the plurality of holes may be repeated along a length of the elongated landing plate 210 of the elongated hollow decking unit.

According to various embodiments, the elongated hollow decking unit may be made of aluminium alloy with high heat conductivity. The high thermal conductivity, which is about 4 times that of steel, may channel heat away to cool the fuel to below burning temperature as fuel courses through the aluminium elongated hollow decking unit. In this manner, the temperature of the fuel may be reduced to well below its ignition temperature. Accordingly, the temperature of a jet fuel may be reduced to below the flash point of the jet fuel.

In a fire triangle, the basic elements are heat, fuel and an oxidizing agent (usually oxygen). A fire may be prevented or extinguished by removing any one of the elements in the fire triangle. When a decking of a landing pad is perforate, it may not be practically achievable to totally remove oxygen from the space below the decking so as to prevent the spread of fire into the space below the decking. This is because there is always going to be free air flow into the void through holes.

Various embodiments rely on removing the heat or fuel, or lowering the temperature of fuel to prevent the spread of fire into the space below the decking. Various embodiments use the basic principle of Bernoulli fluid flow through constricted holes to reduce heat from the fuel and also use high conductivity of aluminium material to further reduce the temperature to below flash point and to channel away fuel quickly before it can add to the fire. In various embodiments, the plurality of holes are configured such that the hole size and the distance between holes may remove fuel and lower the temperature of the fuel. The distance apart between the elongated landing plate and the elongated base plate is also configured to aid in the suppression of fire.

Conventional landing pads typically rely on at least some active or passive agent to lower heat and these may involve introducing additional agent to the landing pad. However, various embodiments differ from the conventional landing pads in that no additional agents are required. According to various embodiments, spread of fire may be prevented by relying on the pressure flows and velocity through the perforated deck without requiring any additional agent to lower the heat. In various embodiments, the continuous cold flow of fuel may be inimical to sustaining a fire and the fuel may be therefore safely channeled away unburned and out of the fire zone, removing the second element of the fire triangle.

Advantageously, various embodiments may be able to quickly and safely drain away unburned fuel from an oil spill on the external surface of the elongated landing plate of the elongated deck unit with a reduce risk of re-ignition of the fuel that is being drained. Further, by draining the unburned fuel quickly and safely, the elongated deck unit may extinguish a fire on the spilled fuel by depriving the fire of the fuel. Thus, various embodiments may be able to extinguish fire on oil spill without requiring external extinguishing agents.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A landing pad comprising: at least one integrally formed elongated hollow decking unit comprising: an elongated landing plate having a plurality of holes; an elongated base plate aligned longitudinally with respect to the elongated landing plate and spaced a distance apart from the elongated landing plate; two elongated side wall plates connecting the elongated landing plate to the elongated base plate, wherein the elongated landing plate, the elongated base plate, and the two elongated side wall plates define a hollow space, wherein a diameter of each of the plurality of holes is 0.01 m to 0.03 m and a distance apart between any two adjacent holes of the plurality of holes is 0.02 m to 0.08 m in a breadthwise direction with respect to the elongated landing plate and 0.06 m to 0.12 m in a lengthwise direction with respect to the elongated landing plate for draining an unburned aviation fuel spilled on the elongated landing plate through the plurality of holes into the at least one elongated hollow decking unit in a manner so as to suppress a flame of a burning aviation fuel from propagating through the plurality of holes into the at least one elongated hollow decking unit, wherein the distance apart between the elongated landing plate and the elongated base plate is 0.12 m to 0.18 m to create a drop from the elongated landing plate to the elongated base plate such that a drained unburned aviation fuel drop through the hollow space from the elongated landing plate onto the elongated base plate, wherein the drop in combination with the plurality of holes are for divorcing the burning aviation fuel from the drained unburned aviation fuel in a manner so as to prevent re-ignition of the drained unburned aviation fuel on the elongated base plate and inside the hollow space of the at least one elongated hollow decking unit; and a gutter extending perpendicularly from a bottom corner of an end of said elongated hollow decking unit, said gutter having a trough and a curved cover to define an enclosed channel.

2. The landing pad of claim 1, wherein the at least one elongated hollow decking unit further comprises an elongated partition wall disposed between the two elongated side walls, wherein a longitudinal edge of the elongated partition wall joins with the elongated landing plate and the other longitudinal edge of the elongated partition wall joins with the elongated base plate.

3. The landing pad of claim 2, wherein the at least one elongated hollow decking unit comprises two or more elongated partition walls.

4. The landing pad of claim 1, wherein the at least one elongated hollow decking unit is configured to slope in a longitudinal direction with respect to a horizontal plane.

5. The landing pad of claim 4, wherein a slope profile of the at least one elongated hollow decking unit is between 1:200 to 1:50.

6. The landing pad of claim 1, wherein the two elongated side wall plates are arranged to be slanted.

7. The landing pad of claim 1, wherein the plurality of holes is dimensioned to limit ventilation into the at least one elongated hollow decking unit.

8. The landing pad of claim 1, wherein the plurality of holes is arranged randomly.

9. The landing pad of claim 1, wherein the plurality of holes is arranged in a line.

10. The landing pad of claim 1, wherein the plurality of holes is arranged in pairs of two holes having a fixed distance apart between the two holes in a pair.

11. The landing pad of claim 1, wherein the plurality of holes is arranged in pairs of two holes with single holes interspersed among the pairs of two holes, wherein the two holes in a pair have a fixed distance apart.

12. The landing pad of claim 9, wherein the arrangement of the plurality of holes is repeated.

13. The landing pad of claim 1, wherein an end of the at least one elongated hollow decking unit is connected to an enclosed channel arranged substantially perpendicular to the at least one elongated hollow decking unit.

14. The landing pad of claim 13, wherein a connection between the at least one elongated hollow decking unit and the enclosed channel is configured to limit ventilation into the enclosed channel.

15. The landing pad of claim 13, wherein the enclosed channel comprises external heat sink fins.

\* \* \* \* \*